United States Patent [19]

Riesland et al.

[11] E Patent Number: Re. 31,970

[45] Reissued Date of Patent: Aug. 13, 1985

[54] HIGH EFFICIENCY BALLAST SYSTEM FOR GASEOUS DISCHARGE LAMPS

[75] Inventors: David H. Riesland, Dickson, Tenn.; Edward E. Hammer, Mayfield Village; Eugene Lemmers, Cleveland Heights, both of Ohio

[73] Assignee: General Electric Company, Schenectady, N.Y.

[21] Appl. No.: 440,107

[22] Filed: Nov. 8, 1982

Related U.S. Patent Documents

Reissue of:

[64] Patent No.: 4,185,233
Issued: Jan. 22, 1980
Appl. No.: 891,889
Filed: Mar. 30, 1978

[51] Int. Cl.[3] ..... H05B 41/16; H05B 41/232

[52] U.S. Cl. ..... 315/276; 315/187; 315/245; 315/257; 315/282; 315/DIG. 5

[58] Field of Search ..... 315/187, 189, 228, 245, 315/254, 256, 257, 276, 278, 282, 323, DIG. 5

[56] References Cited

U.S. PATENT DOCUMENTS

| | | | |
|---|---|---|---|
| 2,965,799 | 12/1960 | Brooks et al. | 315/282 X |
| 2,965,808 | 12/1960 | Lovinger | 315/DIG. 5 |
| 3,099,773 | 7/1963 | Feinberg | 315/278 X |
| 3,112,428 | 11/1963 | Berger | 315/DIG. 5 |
| 3,225,255 | 12/1965 | Hume | 315/232 |
| 3,295,015 | 12/1966 | Rosiak | 315/278 X |

FOREIGN PATENT DOCUMENTS

| | | | |
|---|---|---|---|
| 44-17837 | 8/1969 | Japan | 315/323 |

*Primary Examiner*—Saxfield Chatmon
*Attorney, Agent, or Firm*—N. D. Herkamp; Philip L. Schlamp; Fred Jacob

[57] ABSTRACT

Electrical lamp ballast system for starting and operating fluorescent lamps with improved efficiency. System includes high leakage reactance autotransformer having primary and secondary windings, and a ballast capacitor connected in series with the secondary winding and two serially connected fluorescent lamps of low starting and operating voltage, the secondary circuit being connected to a tap on the primary winding for reducing the ratio of the ballast power input to the lamp light output. The system provides for reduced lamp current crest factor, thereby improving life and operating characteristics of the lamps.

13 Claims, 7 Drawing Figures

10
11
12
S
P
13
14
15
16
17
18
19
20
21
22
24
25
29
1
2
3
6
7
33
35

HIGH EFFICIENCY BALLAST SYSTEM FOR GASEOUS DISCHARGE LAMPS

Matter enclosed in heavy brackets [ ] appears in the original patent but forms no part of this reissue specification; matter printed in italics indicates the additions made by reissue.

The present invention relates to electrical ballast systems for starting and operating gaseous discharge lamps, and more particularly concerns ballast apparatus for operating fluorescent lamps.

It is a general object of the invention to provide ballast apparatus of the above type having improved efficiency for operating gaseous discharge lamps, particularly fluorescent lamps.

It is another object of the invention to provide a lamp-ballast system of the above type having improved operating characteristics.

A particular object of the invention is to reduce the power applied to ballast systems of the above type without corresponding reduction of the light output of the lamps associated with the ballast system.

Another object of the invention is to provide a ballast system which in combination with low energy lamps produces a lamp current waveform with reduced crest factor.

Other objects and advantages will become apparent from the following description and the appended claims.

With the above objects in view, the present invention in one of its aspects relates to a ballast apparatus for starting and operating low pressure gaseous discharge lamps comprising, in combination, input terminal means for connection to an alternating current supply to provide input power to the ballast apparatus, high leakage reactance autotransformer means having a primary winding and a secondary winding, the primary winding being connected at opposite ends to the input terminal means, secondary circuit means including the secondary winding and means for serially connecting a plurality of low pressure gaseous discharge lamps to the secondary winding and said primary winding, capacitor means serially connected in the secondary circuit means for providing a leading current therein, the secondary circuit means connected to a tap on the primary winding for supplying from the primary winding a predetermined voltage in the secondary circuit means for reducing the ratio of the power input to the lamp light output.

The invention will be better understood from the following description taken in conjunction with the accompanying drawings, in which.

Figure 5:
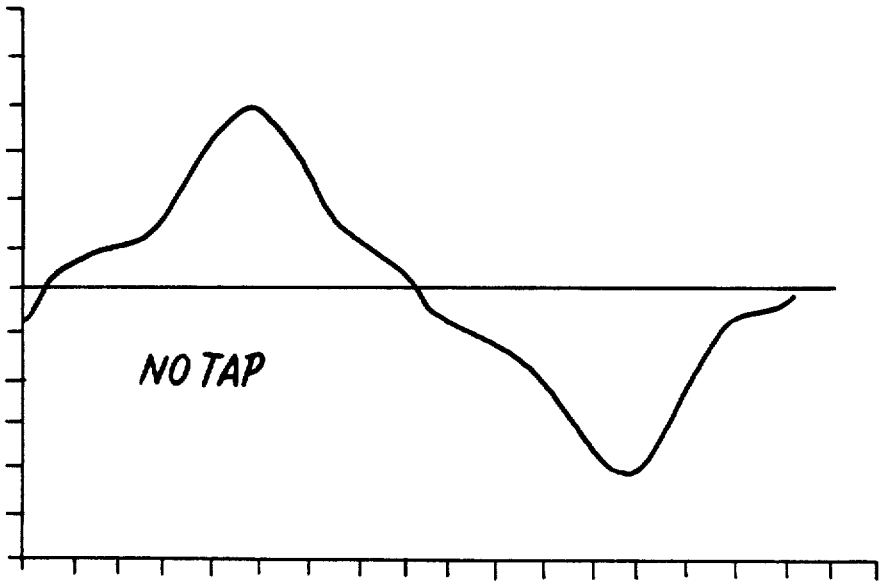
Figure 6:
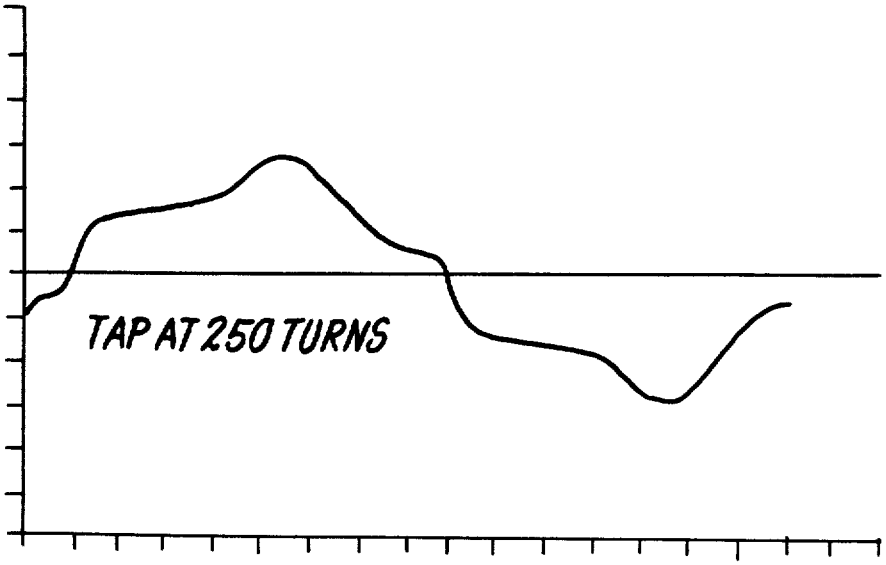

FIG. 5 graphically illustrates the lamp current waveform in a typical prior art ballast system using low energy lamps; FIG. 6 graphically illustrates the lamp current waveform obtained with the ballast system of the invention; and FIG. 7 graphically illustrates the reduction in secondary output voltage required to start the lamps by the ballast system of the invention.

Figure 1:
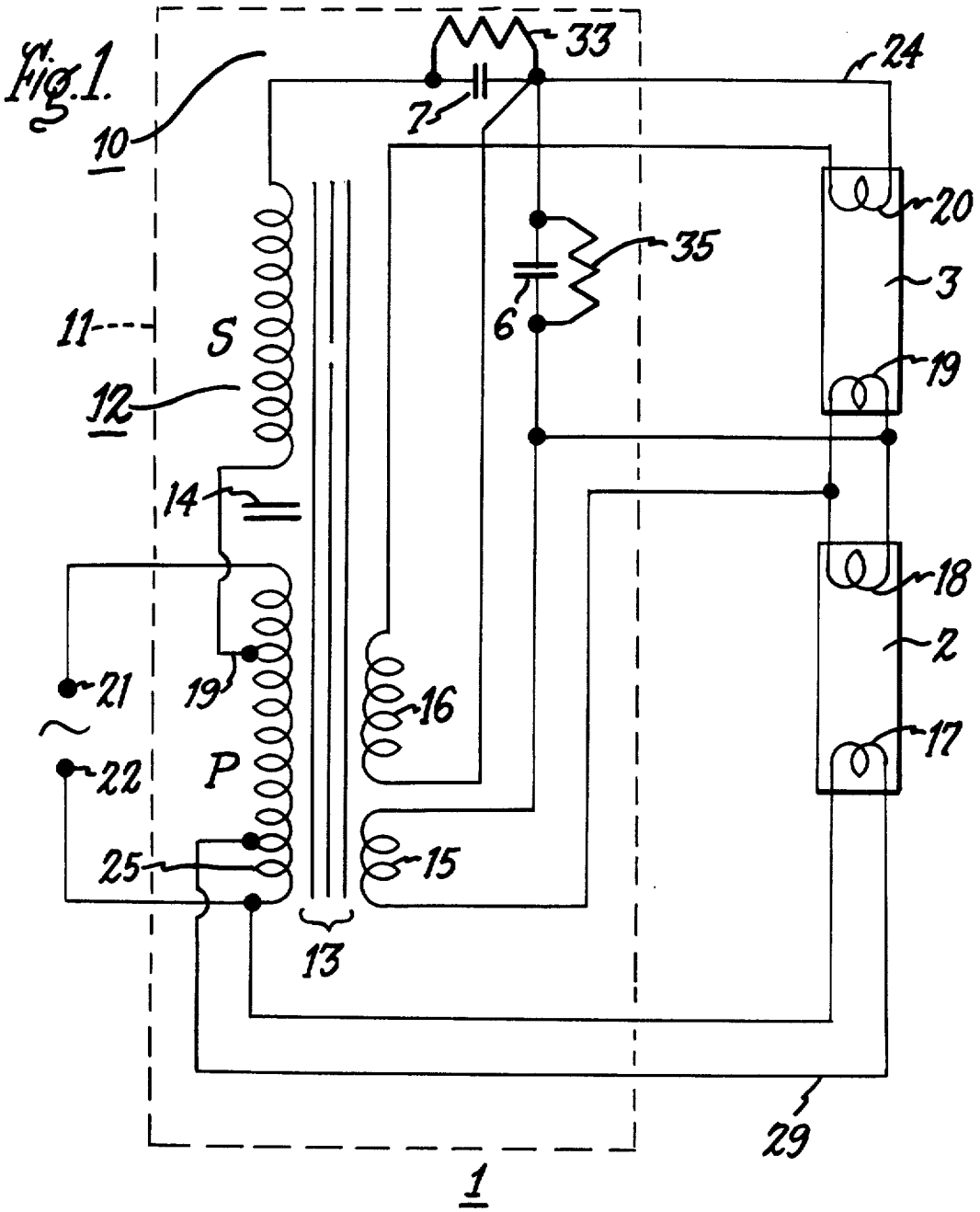
FIG. 1 is a circuit diagram of a lamp ballast system showing an embodiment of the invention.

Referring now to the drawings, and particularly to FIG. 1, there is shown a lamp ballast circuit 1 embodying the invention for starting and operating a pair of serially connected fluorescent lamps 2 and 3.

Figure 4:
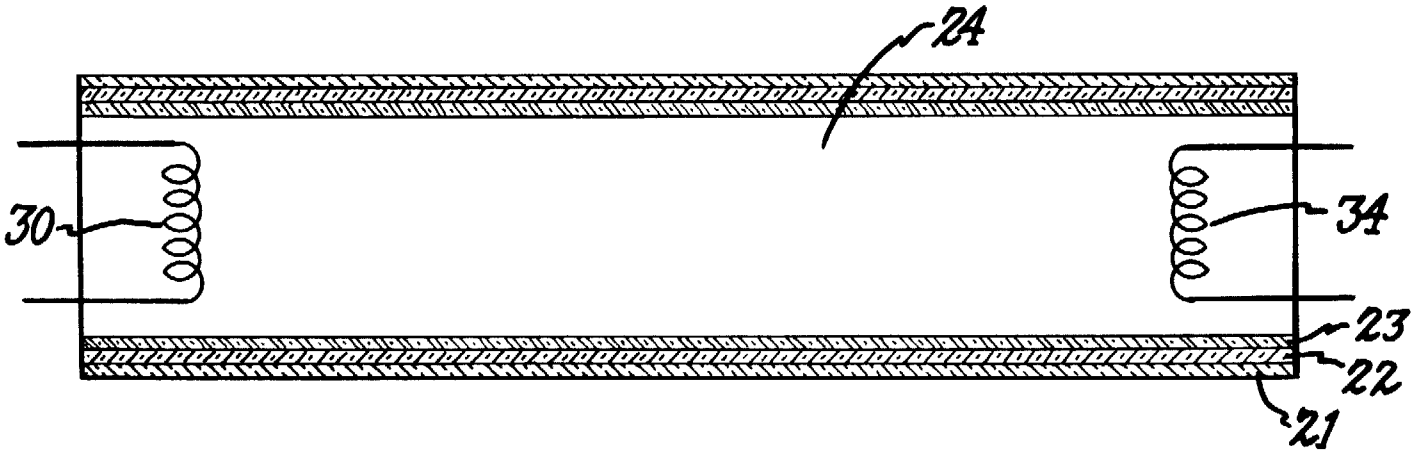
FIG. 4 is a diagrammatic sectional view of a fluorescent lamp which may be employed in the lamp-ballast system of the invention.

Such lamps may be of the known low energy type shown in FIG. 4, which in the illustrated form comprises a glass envelope 21 having electrodes 30, 34 at its opposite ends, a thin, transparent coating of activated tin oxide 22 serving as an internal starting aid, and a fluorescent phosphor coating 23. Contained within envelope 21 is a filling gas comprising mercury and a mixture of krypton and neon in a volume ratio of about 80% to 20% at a pressure of about 1.5 torr. Other inert gases such as argon may replace the neon gas. By "low energy lamp type" is meant lamps which operate at lower wattage than those of equivalent size without proportional loss of lamp efficiency.

Ballast apparatus 10 as illustrated in FIG. 1 is shown enclosed in a dashed rectangle 11 which schematically represents a ballast case. Ballast apparatus 10 includes a high leakage reactance autotransformer 12 having a magnetic core 13, magnetic shunts 14, a primary winding P and a secondary winding S inductively coupled therewith. A plurality of cathode heating windings 15, 16, and 25, are inductively coupled with primary winding P to supply heating current to the lamp filaments 17, 18 and 19, 20 of lamps 2 and 3 respectively. A pair of input terminals 21, 22 are provided for connection to a suitable alternating current supply (not shown) such as a 60 cycle, 120 volt AC supply.

In the illustrated embodiment, a flux leakage path is provided between primary winding P and secondary winding S by virtue of shunts 14 arranged between the windings.

Series capacitor 7 connected at one side to secondary winding S and at the other side to lamp 3 provides leading current in the secondary (lamp) circuit, and in combination with autotransformer 12 provides a current limiting ballast function for the lamp load, as well understood in the art.

Secondary winding S is connected with one terminal of lamp 3 by circuit means which includes capacitor 7 and conductor lead 24, while the other end of serially connected lamp 2 is connected by conductor lead 29 to the end of primary winding P which is connected to input terminal 22.

A starting capacitor 6 is connected across lamp 3 so that open circuit starting voltage is initially applied across lamp 2. Resistors 33 and 35 which respectively shunt series capacitor 7 and starting capacitor 6 are bleeder resistors for removing the charge on the capacitors when the circuit is de-energized.

In accordance with the invention, one end of secondary winding S is connected to a tap 19 on primary winding P so as to reduce the voltage in the lamp circuit. It has been found that this arrangement results in a number of advantages in the ballast system as, for example, improving the operating efficiency of the ballast circuit lowering the series capacitor voltage, and reducing the crest factor of the lamp current waveform, i.e., the ratio of the peak lamp current to the RMS value of lamp current.

Typically, the number of turns tapped off primary winding P by the end of secondary winding S in the embodiment illustrated in FIG. 1, i.e., the turns between tap 19 and the upper end of the primary winding, is such as to reduce the voltage contributed by the primary winding to the secondary circuit about 40 volts, i.e., a reduction of about 10%–15% from the secondary circuit voltage which would otherwise result in an arrangement without a tapped primary winding.

In a ballast system of the rapid start type such as shown in FIG. 1 and which has produced satisfactory results in accordance with the invention, the components had the following values:

| | |
|---|---|
| Primary winding P | 853 turns |
| Secondary winding S | 1,422 turns |
| Turns tapped off primary | 204 turns |
| Transformer core | Shell type |
| Center leg, cross section | .57 $in^2$. |
| Cathode heating winding 25 | 28 turns |
| Cathode heating winding 15 | 33 turns |
| Cathode heating winding 16 | 31 turns |
| Series capacitor 7 | 4.5 mfd |
| Starting capacitor 6 | .1 mfd |
| Bleeder resistor 35 | 100 K ohms |
| Lamps, two | 48 in., 35 watt, Rapid Start |

Tests made on a lamp-ballast system of the above specified construction showed that the total lamp lumens was about 5980 lumens with a power input of 79 watts.

Figure 2:
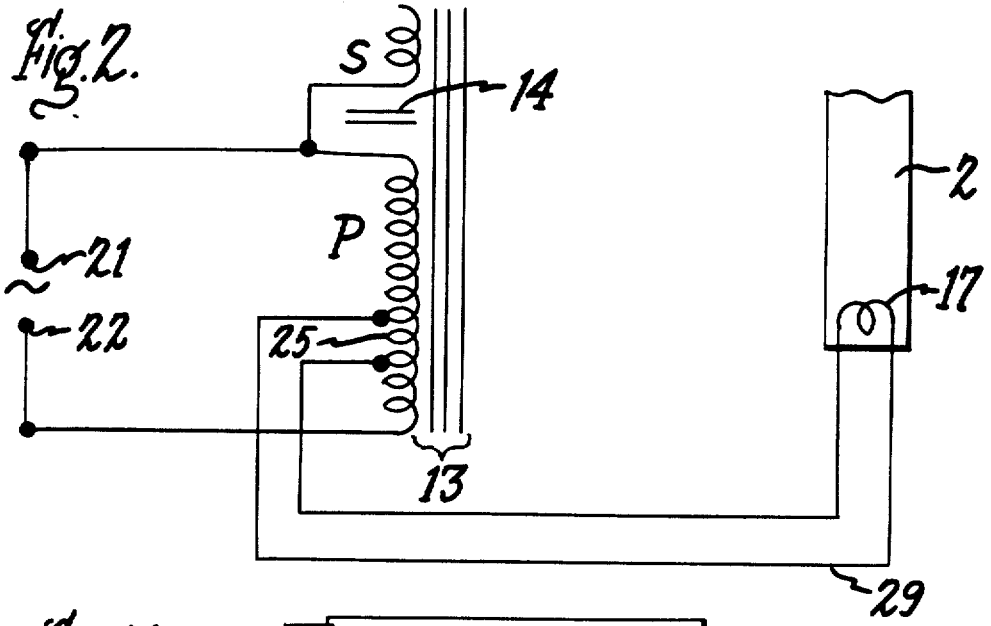
FIG. 2 is a circuit diagram showing a modification of the FIG. 1 ballast system.

FIG. 2 shows a portion of the FIG. 1 rapid start ballast system depicting an alternative means for reducing the primary voltage in the lamp circuit. As shown, removal of a portion of the primary voltage from the lamp circuit in accordance with the invention is achieved by re-locating the cathode heating winding 25 so as to tap off the desired number of primary winding turns, instead of tapping the primary winding P with the end of secondary winding S as in the FIG. 1 embodiment.

Figure 3:
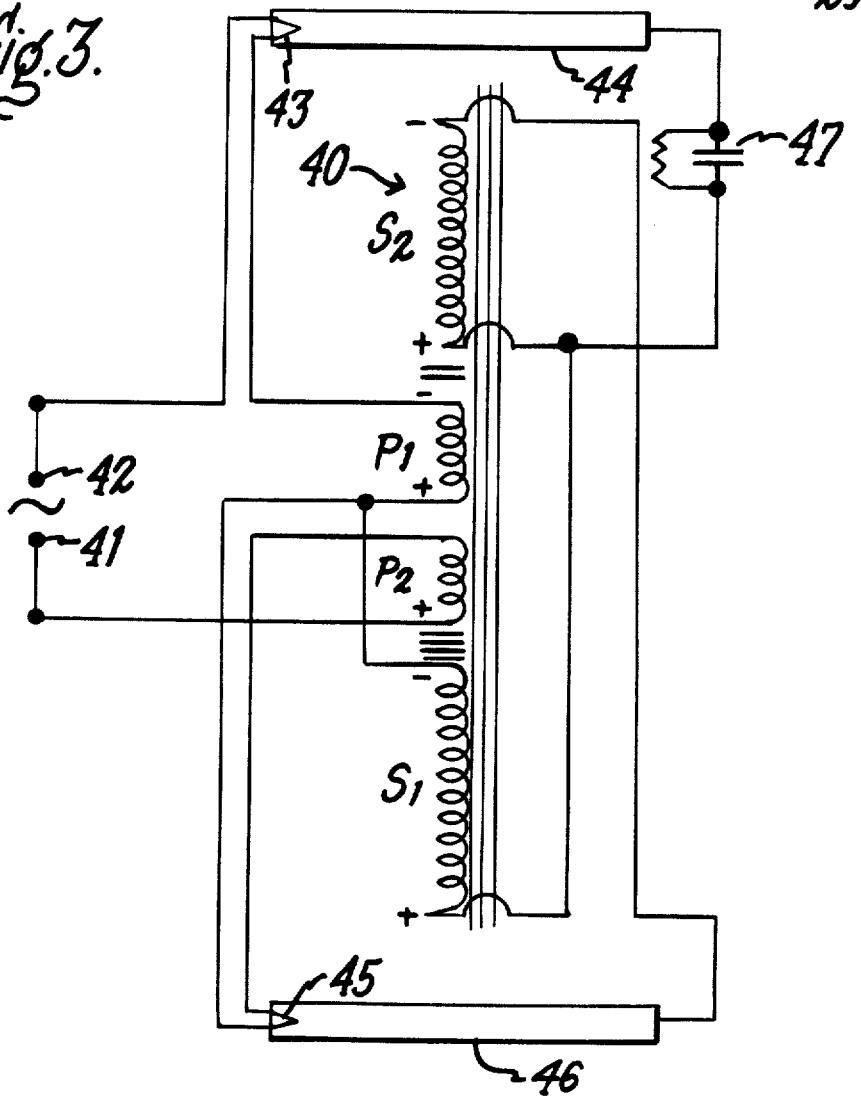
FIG. 3 is a circuit diagram of another embodiment of the lamp-ballast system of the invention.

FIG. 3 shows a different embodiment of the invention comprising an instant start ballast system having an autotransformer 40 comprising a primary winding formed of portions P1 and P2 connected at adjacent ends at a connection constituting a tap on the primary winding, and wherein the remote end of portion P2 is connected directly to AC supply terminal 41 and the remote end of portion P1 is connected to the other AC supply terminal 42 via a connection 43 in a disconnect lampholder for fluorescent lamp 44, while the remaining ends of portions P1 and P2 are connected to a similar connection 45 in fluorescent lamp 46. Secondary winding S2 is in autotransformer relationship with primary winding portion P1 serially connected through series capacitor 47 and lamps 44 and 46. Portion P2, and its corresponding voltage, thus is effectively removed from the secondary (lamp) circuit. Secondary winding S1 connected at one end to primary portion P1 and at the other end in series with series capacitor 47 and lamp 44 serves to provide a starting voltage for lamp 44. After lamp starting, secondary winding S1, due to its relatively high impedance, supplies minimal current to the lamp circuit during operation of the lamp.

FIGS. 5 and 6 graphically show the improvement in operating lamp current characteristics obtained in connection with the present invention. FIG. 5 shows the lamp current waveform resulting from the use of a ballast circuit similar to that shown in FIG. 1 except that the secondary winding was connected to the end of the primary winding rather than to a tap on the latter. The lamps used in this test were low energy fluorescent lamps of the construction shown in FIG. 4. As will be seen, the peak lamp current is relatively high with respect to the RMS lamp current, the lamp current crest factor being at a level typical of prior ballast systems of this type. FIG. 6 is a graph on the same scale as the FIG. 5 graph depicting the lamp current waveform obtained with the FIG. 1 ballast circuit including the tapped primary arrangement and the FIG. 4 lamp. In this circuit, 250 turns were tapped off the primary winding. As is evident, the peak lamp current is markedly lower than that obtained with the prior art ballast arrangement represented by FIG. 5, resulting in a correspondingly reduced lamp current crest factor. The life and operating characteristics of the lamps are thereby substantially improved.

Figure 7:
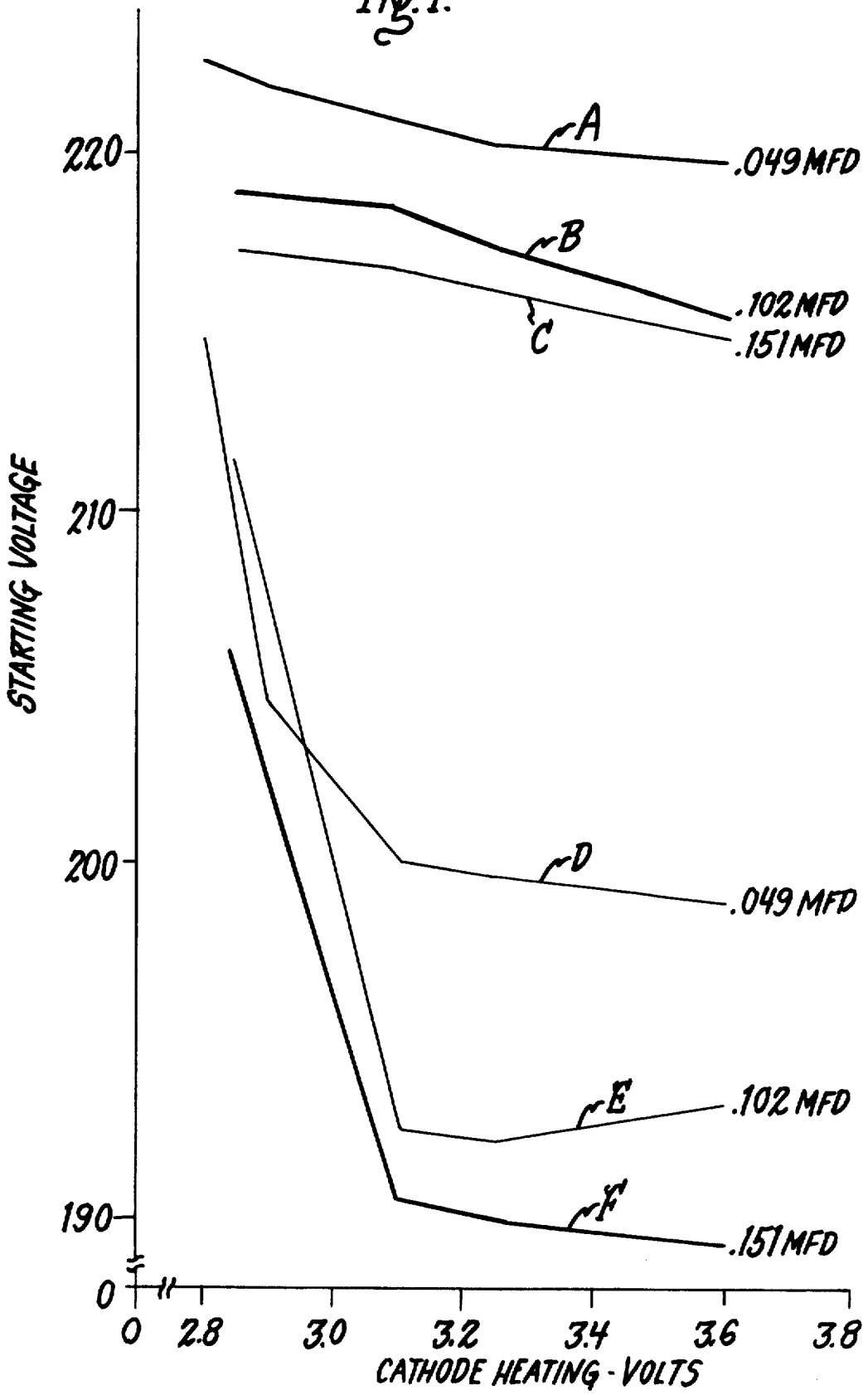

In accordance with another feature of the invention, starting capacitor 6 in the FIG. 1 circuit is preferably of higher value than previously used with low energy lamps of the type depicted in FIG. 4 to facilitate starting of the lamps. In a circuit of the described type, it has been found that use of a starting type capacitor having a value in the range of about 0.08–0.16 mfd produced unexpectedly large improvement in the starting of lamps of the described type. FIG. 7 graphically shows the effects on lamp starting with the use of starting capacitors of various values and two lamps of different types. In the graph, in which secondary circuit starting voltage is plotted against cathode heating-voltage, Curves A, B and C depict the starting effects of different capacitor values on a conventional 40 watt fluorescent lamp, whereas Curves D, E, and F depict the starting effects of different capacitor values on a low energy flourescent lamp of the type shown in FIG. 4. Associated with each of the curves is the value of the starting capacitor employed in the circuit. As will be evident from the graph, the reduction in starting voltage required to start lamps of the described low energy type using higher capacitor values in accordance with the invention is unexpectedly greater than that obtained by similar means with respect to the conventional lamp. The graph also shows an unexpected reduction in required starting voltage for a given increase in cathode heating voltage.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

[1. Ballast apparatus for starting and operating low pressure gaseous discharge lamps comprising, in combination, input terminal means for connection to an alternating current supply to provide input power to the ballast apparatus, high leakage reactance autotransformer means having primary winding means and secondary winding means, said primary winding means being connected at opposite ends to said input terminal means, operating secondary circuit means including at least a portion of said secondary winding means and means for serially connecting low pressure gaseous discharge lamp means to at least said portion of said secondary winding means and at least a portion of said primary winding means, capacitor means serially connected in said operating secondary circuit means for providing a leading current therein, said operating secondary circuit means connected to a tap on said primary winding means for supplying from said primary winding means a predetermined voltage in said secondary circuit means for reducing the ratio of said power input to the lamp light output, the portions of said primary winding means on opposite sides of said tap having the same polarity, said secondary winding means having a single polarity.]

2. Ballast apparatus as defined in claim [1,] *13*, wherein said secondary winding means is connected to said tap on said primary winding means.

3. Ballast apparatus as defined in claim [1,] *13*, including lamp starting means connected to said lamp connecting means.

4. Ballast apparatus as defined in claim [1,] *13*, wherein said lamp connecting means is connected to said tap on said primary winding means.

5. Ballast apparatus as defined in claim [1,] *13*, including lamp cathode heating windings inductively coupled to said primary winding means.

6. Ballast apparatus as defined in claim 5, including a lamp starting capacitor connected to said lamp connecting means.

7. Ballast apparatus as defined in claim 6, said starting capacitor having a value of about 0.08 to 0.16 microfarads.

8. Ballast apparatus as defined in claim [1,] *13*, said primary winding means comprising first and second winding portions having adjacent ends connected at said tap, said lamp connecting means connected to said tap, the remote end of said first primary winding portion being connected to said input terminal means by said lamp connecting means and the remote end of said second primary winding portion being connected to said input terminal means.

9. Ballast apparatus as defined in claim 8, said secondary winding means having first and second winding portions, said first winding portion thereof being connected to said tap and in series with said capacitor and said lamp connecting means for starting said lamp means, said second winding portion thereof being connected serially with said capacitor and said first primary winding portion by said lamp connecting means for providing operating voltage for the lamp means.

10. Ballast apparatus as defined in claim [1,] *13*, and a pair of serially connected low energy fluorescent lamps connected to said lamp connecting means.

11. Ballast apparatus as defined in claim 10, said lamps comprising an envelope having electrodes at opposite ends and containing a filling gas of mercury and a mixture of krypton and an inert gas, and an electrically conducting coating on said envelope co-acting with said electrodes for facilitating starting of said lamps.

12. Ballast apparatus as defined in claim 11, and a starting capacitor having a value of about 0.08 to 0.16 microfarads connected across one of said fluorescent lamps for facilitating starting of said lamps.

*13. Ballast apparatus for starting and operating low pressure gaseous discharge lamps comprising, in combination, input terminal means for connection to an alternating current supply to provide input power to the ballast apparatus, high leakage reactance autotransformer means having primary winding means and secondary winding means, said primary winding means being connected at opposite ends to said input terminal means, operating secondary circuit means including at least a portion of said secondary winding means and means for serially connecting low pressure gaseous discharge lamp means to at least said portion of said secondary winding means and at least a portion of said primary winding means, capacitor means serially connected in said operating secondary circuit means for providing a leading current therein, said operating secondary circuit means connected to a tap on said primary winding means for supplying from said primary winding means a predetermined voltage to said secondary circuit means; said tap being so located on said primary winding means to reduce the voltage of said secondary circuit means by an amount in the range of 10–15% of the sum of the primary and the secondary winding means voltages for reducing the ratio of said power input to the lamp light output, the portions of said primary winding means on opposite sides of said tap having the same polarity, said secondary winding means having a single polarity at any point in time.*

* * * * *